(12) United States Patent
Fujita et al.

(10) Patent No.: US 11,789,495 B2
(45) Date of Patent: Oct. 17, 2023

(54) ELECTRONIC DEVICE RETAINING STRUCTURE AND ELECTRONIC DEVICE RETAINING DEVICE

(71) Applicant: Panasonic Intellectual Property Management Co., Ltd., Osaka (JP)

(72) Inventors: Shinji Fujita, Osaka (JP); Hideki Harada, Osaka (JP); Shun Higashihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 17/334,079

(22) Filed: May 28, 2021

(65) Prior Publication Data

US 2021/0285477 A1 Sep. 16, 2021

Related U.S. Application Data

(63) Continuation of application No. PCT/JP2019/047074, filed on Dec. 2, 2019.

(30) Foreign Application Priority Data

Dec. 21, 2018 (JP) ................. 2018-240190

(51) Int. Cl.
*G06F 1/16* (2006.01)
(52) U.S. Cl.
CPC ................... *G06F 1/1637* (2013.01)
(58) Field of Classification Search
CPC .......... F16B 5/06; F16B 2/245; F16B 5/0635; G06F 1/1637; G06F 1/1632;
(Continued)

(56) References Cited

U.S. PATENT DOCUMENTS

| 5,316,491 A | 5/1994 | Satou |
| 5,393,241 A | 2/1995 | Honda |

(Continued)

FOREIGN PATENT DOCUMENTS

| JP | H05-150862 A | 6/1993 |
| JP | 03015036 U | 8/1995 |

(Continued)

OTHER PUBLICATIONS

Mounted-It! Laptop VESA Mount Tray [online]. Mounted-It!, Feb. 22, 2017 [retrieved on Jul. 6, 2023]. Retrieved from the internet: <URL:https://www.amazon.com/Mount-Universal-Notebook-Monitor-Computers/dp/B06WW8NVTK?ref_=ast_sto_dp>. (Year: 2017).*

(Continued)

*Primary Examiner* — James Wu
(74) *Attorney, Agent, or Firm* — Renner, Otto, Boisselle & Sklar, LLP (57) ABSTRACT

An electronic device retaining structure includes: an electronic device having a device body and a display rotatably connected to the device body; a base having a placing surface placed with the electronic device; and at least one pair of retainers mounted on an outer periphery of the base and facing each other. Each of the at least one pair of retainers has a retaining claw protruding from an outer side to an inner side of the placing surface. The retaining claw has, at the upper part, an upward slope sloping upward from the inner side toward the outer side and coming into contact with a side edge of the display when the display is rotated in a direction approaching the placing surface, and below the upward slope, a downward slope sloping downward from the inner side toward the outer side and pressing the device body against the placing surface.

6 Claims, 9 Drawing Sheets

(58) Field of Classification Search
CPC ........ B60R 11/0252; B60R 2011/0071; F16M 11/04; F16M 13/00; F16M 13/02; H04M 1/04
See application file for complete search history.

(56) References Cited

U.S. PATENT DOCUMENTS

| | | | |
|---|---|---|---|
| 5,499,129 | A | 3/1996 | Satou |
| 5,504,648 | A | 4/1996 | Honda |
| 5,507,661 | A | 4/1996 | Honda |
| 6,585,212 | B2 * | 7/2003 | Carnevali ........... B60R 11/0252 312/319.1 |
| 10,050,658 | B2 * | 8/2018 | Carnevali ............ H04B 1/3888 |
| 2002/0149708 | A1 | 10/2002 | Nagata |
| 2013/0277521 | A1 * | 10/2013 | Hiramoto ............... F16M 11/14 248/274.1 |

FOREIGN PATENT DOCUMENTS

| | | |
|---|---|---|
| JP | 2013-091334 A | 5/2013 |
| JP | 2014-203190 A | 10/2014 |
| WO | 2002/009976 A1 | 2/2002 |

OTHER PUBLICATIONS

International Search Report for corresponding Application No. PCT/JP2019/047074, dated Feb. 25, 2020.

* cited by examiner

ELECTRONIC DEVICE RETAINING STRUCTURE AND ELECTRONIC DEVICE RETAINING DEVICE

BACKGROUND

1. Technical Field

The present invention relates to an electronic device retaining structure and an electronic device retaining device.

2. Description of the Related Art

As conventional electronic device retaining devices, those having various structures are known. For example, there is known an electronic device retaining device that retains an electronic device by hooking both sides of an electronic device body with retaining claws (see PTL 1).

PTL 1 is Unexamined Japanese Patent Publication No. 1105-150862.

SUMMARY

However, in the conventional electronic device retaining device, there is still room for improvement from the viewpoint of preventing contact between a screen of a display provided in the electronic device and the retaining claws.

Therefore, an object of the present disclosure is to solve the above problem and to provide an electronic device retaining structure and an electronic device retaining device that can prevent contact between the screen of the electronic device and the retaining claw.

In order to achieve the above object, an electronic device retaining structure according to the present disclosure includes: an electronic device having a device body and a display rotatably connected to the device body through a rotating shaft; a base having a placing surface placed with the electronic device; and at least one pair of retainers mounted on an outer periphery of the base and facing each other, and pressing and retaining the device body against the placing surface. Each of the at least one pair of retainers has a retaining claw protruding in plan view from an outer side to an inner side of the placing surface and being contactable with the electronic device. The retaining claw has, at an upper part, an upward slope sloping upward in side view from the inner side toward the outer side of the placing surface and coming into contact with a side edge of the display when the display is rotated around the rotating shaft in a direction approaching the placing surface, and below the upward slope, a downward slope sloping downward in side view from the inner side toward the outer side of the placing surface and pressing the device body against the placing surface.

An electronic device retaining device according to the present disclosure includes: a base having a placing surface placed with an electronic device; and a pair of retainers mounted on an outer periphery of the base and facing each other and be movable along the outer periphery, and pressing and retaining the electronic device against the placing surface. Each of the pair of retainers has a retaining claw protruding in plan view from an outer side to an inner side of the placing surface and being contactable with the electronic device. The retaining claw has, at an upper part, an upward slope sloping upward in side view from the inner side toward the outer side of the placing surface, and below the upward slope, a downward slope sloping downward in side view from the inner side toward the outer side of the placing surface.

According to the electronic device retaining structure and the electronic device retaining device according to the present disclosure, the screen of the electronic device can be prevented from coming into contact with the retaining claw.

DETAILED DESCRIPTION (Knowledge that has Become the Basis of the Present Invention)

As a result of diligent studies to prevent contact between a screen of an electronic device and a retaining claw, the present inventors have obtained the following findings.

The conventional electronic device retaining device includes a base having a placing surface placed with an electronic device and retaining claws retaining the electronic device. The retaining claws are provided on the outer periphery of the base so as to face each other, and are formed so as to protrude toward the electronic device to be mounted. The upper surfaces of the retaining claws are formed parallel to the placing surface placed with the electronic device. Further, the electronic device mounted on the electronic device retaining device has a device body and a display rotatably connected to the device body through a rotating shaft.

However, in the conventional electronic device retaining device, in the case of the upper surface of the device body being sandwiched between the retaining claws and the placing surface and retained, when the display is rotated around the rotating shaft in a direction approaching the placing surface, the screen of the display may come into contact with the retaining claws. Specifically, the end of the retaining claw located on the side of the rotating shaft may come into contact with the screen of the display. Therefore, the retaining claw may damage the screen.

Meanwhile, the present inventors have found a configuration in which the retaining claw has an upward slope sloping upward from the inner side toward the outer side of the placing surface. It has been found that, with this configuration, when the display is rotated around the rotating shaft in the direction approaching the placing surface, the upward slope of the retaining claw abuts to a side edge of the display. As a result, it has been found that the contact between the screen arranged on the inner side of the side edge of the display and the retaining claw can be prevented, and the damage to the screen can be prevented.

Based on these novel findings, the present inventors have arrived at the following invention.

According to a first aspect of the present disclosure, there is provided an electronic device retaining structure including: an electronic device having a device body and a display rotatably connected to the device body through a rotating shaft; a base having a placing surface placed with the electronic device; and at least one pair of retainers mounted on an outer periphery of the base so as to face each other, and pressing and retaining the device body against the placing surface. Each of the at least one pair of retainers has a retaining claw protruding in plan view from an outer side to an inner side of the placing surface and being contactable with the electronic device. The retaining claw has, at an upper part, an upward slope sloping upward in side view from the inner side toward the outer side of the placing surface and coming into contact with a side edge of the display when the display is rotated around a rotating shaft in a direction approaching the placing surface, and below the upward slope, a downward slope sloping downward in side view from the inner side toward the outer side of the placing surface and pressing the device body against the placing surface.

According to a second aspect of the present disclosure, there is provided the electronic device retaining structure according to the first aspect in which each of the at least one pair of retainers is mounted on the outer periphery of the base by a fixing shaft, and the at least one pair of retainers are rotated around the fixing shaft to cause a gap between the downward slope and the placing surface to be adjusted.

According to a third aspect of the present disclosure, there is provided the electronic device retaining structure according to the first or second aspect in which the upward slope has a slope angle with respect to a direction orthogonal to the placing surface equal to a slope angle of the downward slope with respect to the direction orthogonal to the placing surface.

According to a fourth aspect of the present disclosure, there is provided the electronic device retaining structure according to any one of the first to third aspects in which the at least one pair of retainers are mounted so as to face each other on the outer periphery of the base and are provided in a plurality of the pairs.

According to a fifth aspect of the present disclosure, there is provided the electronic device retaining structure according to any one of the first to fourth aspects in which the retaining claw has, at the upward slope, a cushioning material that comes into contact with the side edge of the display when the display is rotated around the rotating shaft in a direction approaching the placing surface.

According to a sixth aspect of the present disclosure, there is provided an electronic device retaining device including: a base having a placing surface placed with an electronic device; and a pair of retainers mounted on an outer periphery of the base so as to face each other and be movable along the outer periphery, and pressing and retaining the electronic device against the placing surface. Each of the pair of retainers has a retaining claw protruding in plan view from an outer side to an inner side of the placing surface and being contactable with the electronic device. Provided is the electronic device retaining device in which the retaining claw has, at an upper part thereof, an upward slope sloping upward in side view from the inner side toward the outer side of the placing surface, and below the upward slope, a downward slope sloping downward in side view from the inner side toward the outer side of the placing surface.

According to a seventh aspect of the present disclosure, there is provided the electronic device retaining device according to the sixth aspect in which each of the pair of retainers is mounted on the outer periphery of the base by a fixing shaft, and the at least one pair of retainers are rotated around the fixing shaft to cause a gap between the downward slope and the placing surface to be adjusted.

Hereinafter, the electronic device retaining structure and the electronic device retaining device according to the present exemplary embodiment are described with reference to the accompanying drawings. In the drawings, substantially the same members are designated by the same reference numerals.

Further, in the following, for convenience of explanation, terms indicating directions such as "up", "down", "front", and "rear" are used assuming a state during normal use. However, these terms do not mean to limit the usage state and the like of the electronic device retaining device of the present disclosure.

Further, in the following drawings, the X direction indicates the front-rear direction of electronic device retaining device 1 according to the exemplary embodiment. The Y direction is a direction orthogonal to the X direction and indicates the left-right direction of electronic device retaining device 1. The Z direction is a direction orthogonal to the X direction and the Y direction, and indicates the up-down direction of electronic device retaining device 1.

Exemplary Embodiment

Figure 1:
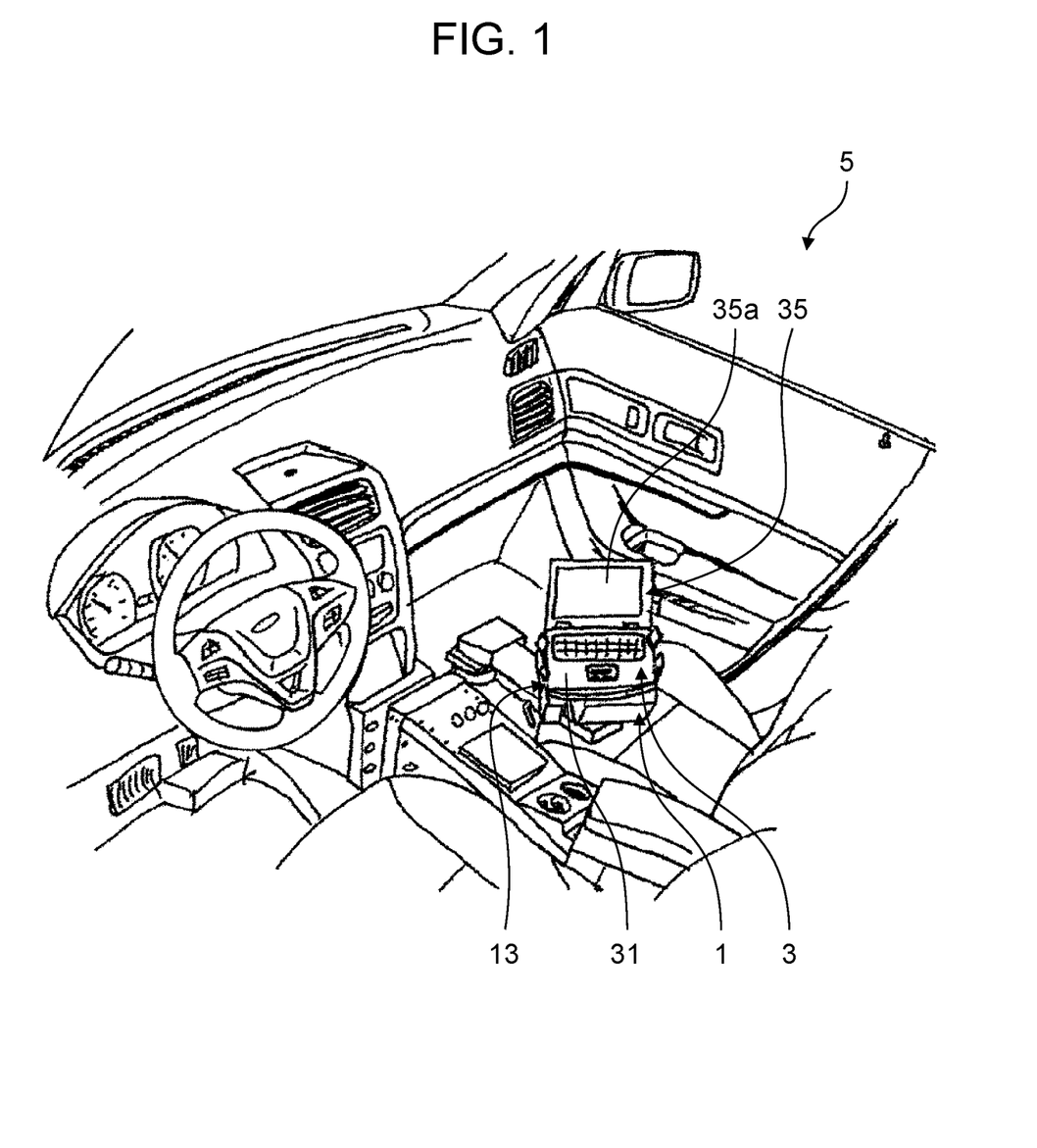
FIG. 1 is a perspective view showing an example of a usage environment of an electronic device retaining device according to one exemplary embodiment of the present disclosure.

FIG. 1 is a perspective view showing an example of a usage environment of electronic device retaining device 1. As shown in FIG. 1, electronic device retaining device 1 is provided in the interior of automobile 5, for example, and retains electronic device 3. Electronic device retaining device 1 is also referred to such as a universal dock or a universal mounter.

Figure 2:
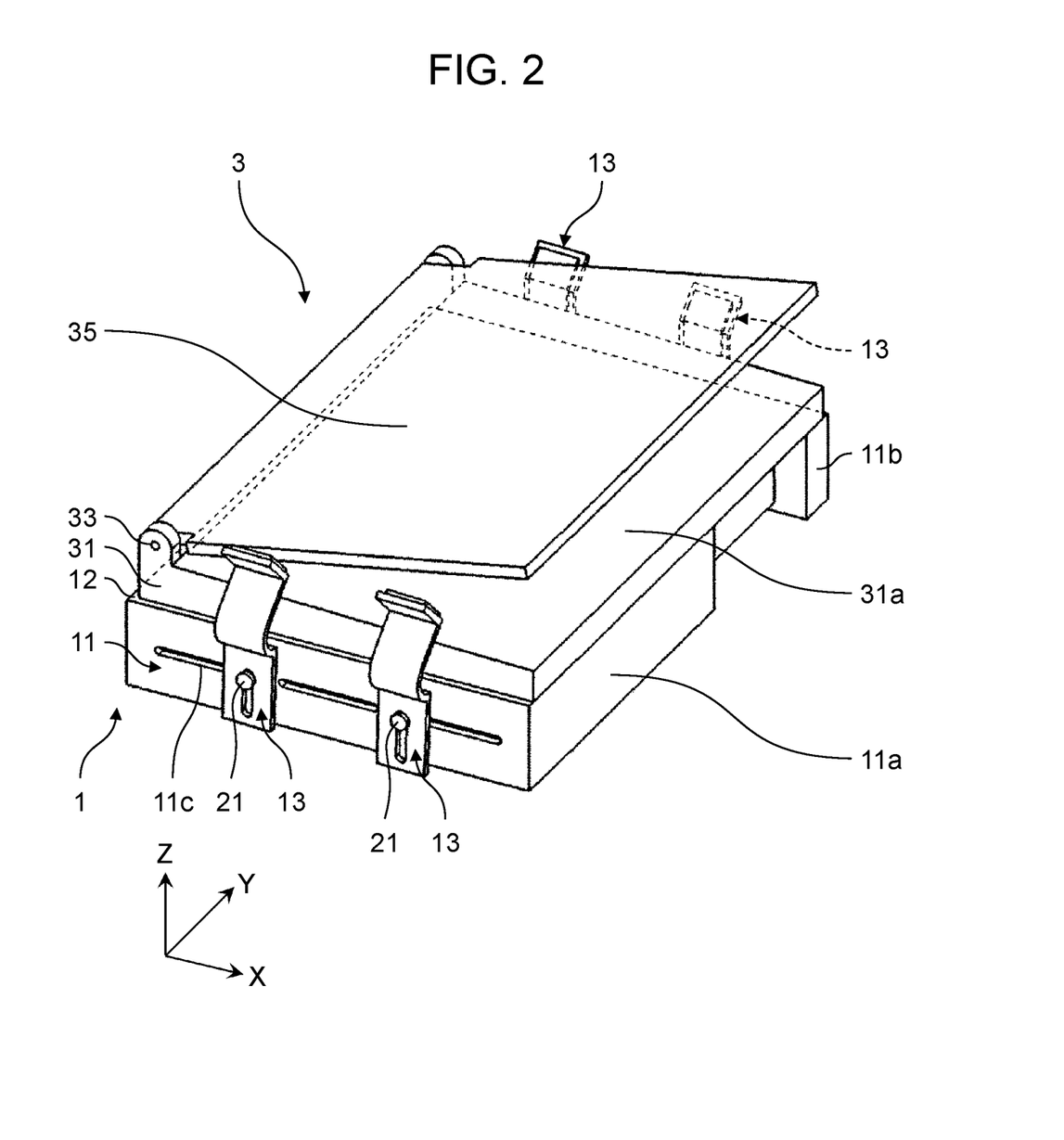
FIG. 2 is a perspective view of the electronic device retaining device according to the one exemplary embodiment of the present disclosure.
Figure 3:
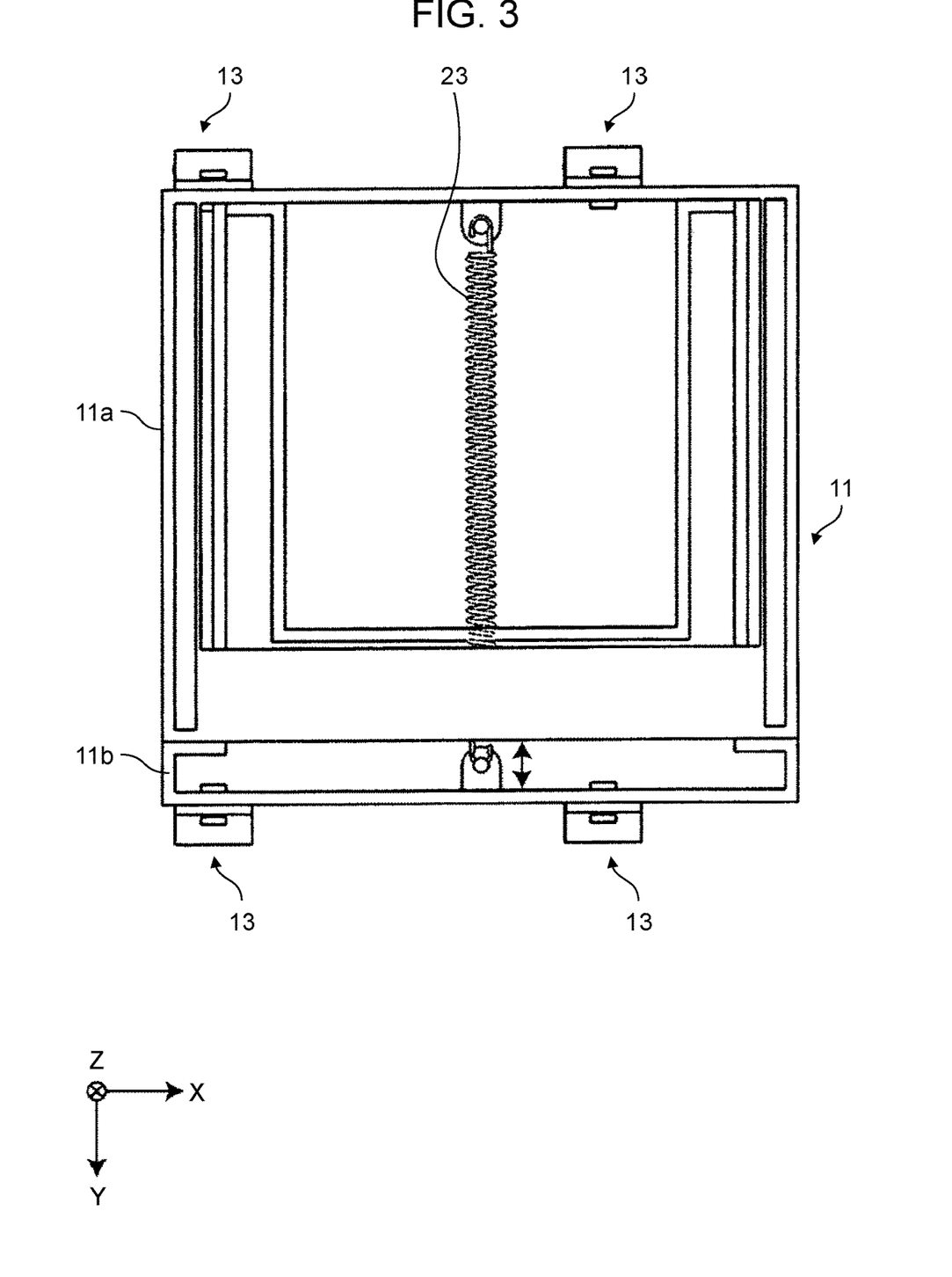
FIG. 3 is a bottom view of FIG. 2.

FIG. 2 is a perspective view of electronic device retaining device 1 retaining electronic device 3. FIG. 3 is a bottom view of FIG. 2. As shown in FIGS. 2 and 3, electronic device retaining device 1 includes base 11 placed with electronic device 3 and retainers 13 that retain electronic device 3. Electronic device 3 has device body 31 and display 35. Electronic device 3 is, for example, a notebook computer or a mobile phone. Device body 31 has an input unit such as a keyboard. Display 35 has screen 35a (FIG. 1). Display 35 is rotatably connected to device body 31 through rotating shaft 33.

Base 11 is a part constituting the body of electronic device retaining device 1. In the present exemplary embodiment, base 11 has fixed part 11a and movable part 11b. Fixed part 11a is fixed to, for example, the interior of automobile 5. Movable part 11b is mounted to fixed part 11a so as to be movable in the left-right direction (Y direction). Specifically, as shown in FIG. 3, movable part 11b is mounted to fixed part 11a such that, for example, elastic body 23 such as a spring biases movable part 11b toward fixed part 11a.

Movable part 1*b* allows the width (a length in the Y direction) of base 11 to be adjusted.

Base 11 is formed in a substantially rectangular parallelepiped shape. Base 11 has placing surface 12 placed with electronic device 3. Placing surface 12 is formed on the upper surface of base 11. Through holes 11*c* penetrating in the left-right direction (Y direction) are provided on the left and right side surfaces of base 11. Through holes 11*c* are formed so as to extend in the front-rear direction (X direction).

Each retainer 13 is a plate-shaped member that presses and retains device body 31 against placing surface 12. Specifically, retainers 13 and placing surface 12 sandwich and retain upper surface 31*a* of device body 31. Retainers 13 are mounted to face each other on the outer periphery of base 11. Specifically, retainers 13 are mounted on the left and right side surfaces of base 11 so as to face each other in the left-right direction (Y direction). Each retainer 13 is mounted on the outer periphery of base 11 by fixing shaft 21. In the present exemplary embodiment, retainers 13 are mounted in a plurality of pairs (for example, two pairs) facing each other on the outer periphery of base 11. Specifically, a plurality of pairs of retainers 13 are mounted along the front-rear direction (X direction) to the left and right side surfaces of base 11.

Figure 4:
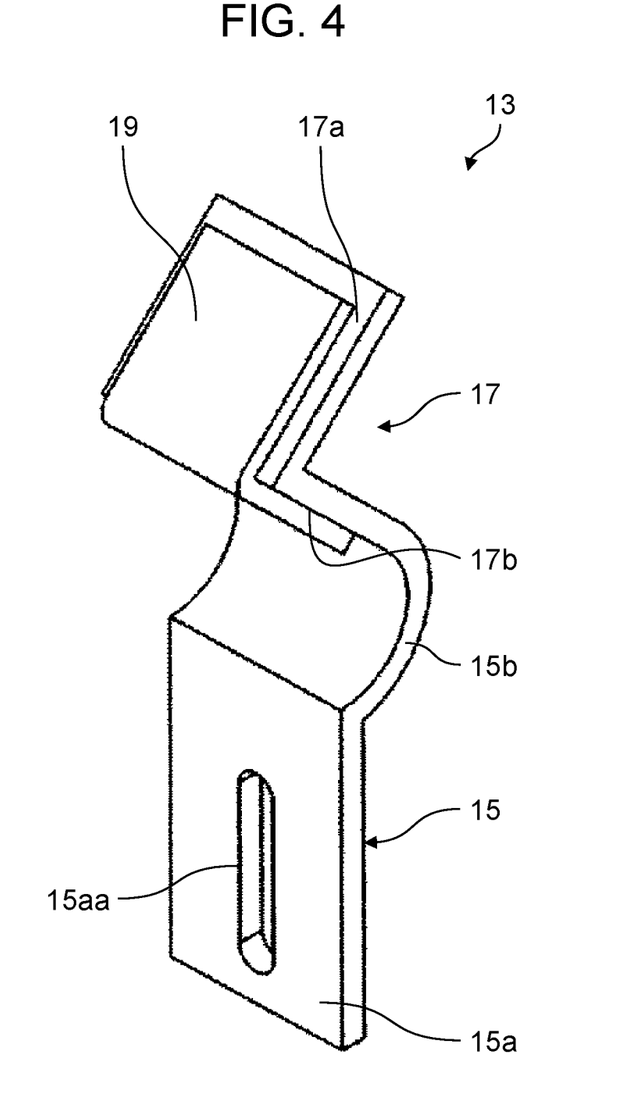
FIG. 4 is a perspective view of a retainer of FIG. 2.
Figure 5:
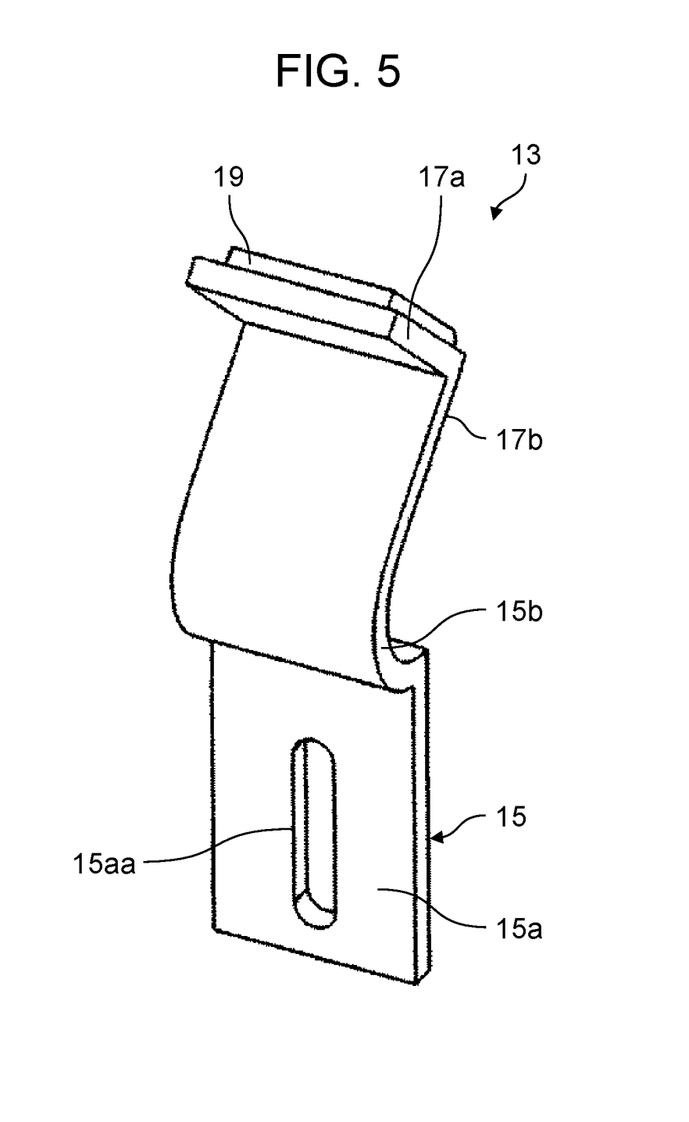
FIG. 5 is a perspective view of the retainer of FIG. 2 in a direction different from that of FIG. 4.
Figure 6:
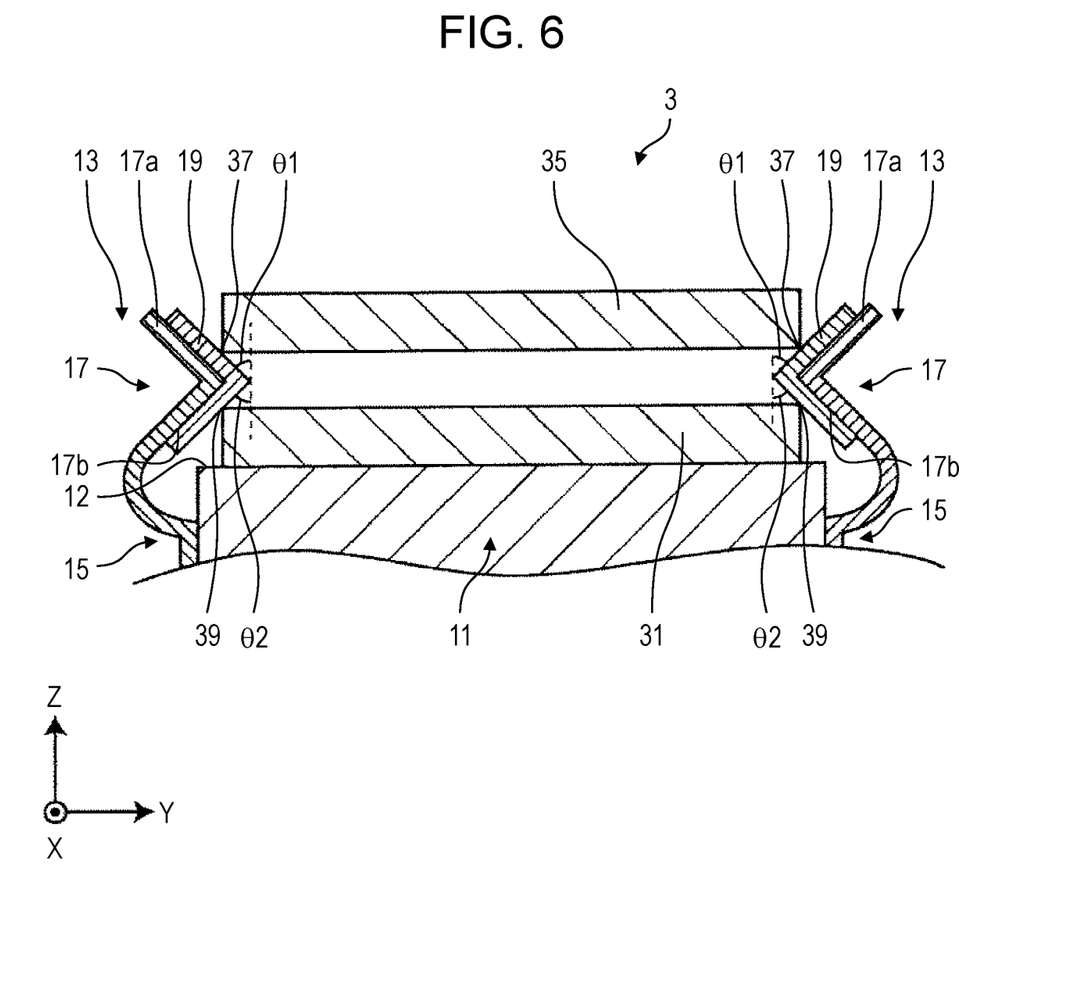
FIG. 6 is a cross-sectional view of FIG. 2 cut along a plane perpendicular to the X direction, showing a state of the electronic device retained by the electronic device retaining device.

Next, retainer 13 is described in detail with reference to FIGS. 4 to 6. FIG. 4 is a perspective view of retainer 13. FIG. 5 is a perspective view of retainer 13 viewed from a different direction from that of FIG. 4. FIG. 6 is a cross-sectional view of FIG. 2 cut along a plane perpendicular to the X direction, showing a state of electronic device 3 retained by electronic device retaining device 1.

As shown in FIGS. 4 to 6, in the present exemplary embodiment, retainer 13 has retaining claw 17 configured to retain electronic device 3 and support 15 configured to support retaining claw 17.

Retaining claw 17 is provided so as to protrude from the outer side to the inner side of placing surface 12 and be contactable with electronic device 3 in plan view. That is, retaining claw 17 protrudes toward electronic device 3 placed on placing surface 12 and is formed in a V shape. In the present exemplary embodiment, retaining claw 17 is formed so as to extend in the left-right direction in plan view. Note that in plan view means viewing from a direction orthogonal to placing surface 12.

Retaining claw 17 has upward slope 17*a* at the upper part and downward slope 17*b* below upward slope 17*a*. In the present exemplary embodiment, upward slope 17*a* and downward slope 17*b* have cushioning material 19. Cushioning material 19 is formed on the surfaces of upward slope 17*a* and downward slope 17*b* so as to straddle a boundary between upward slope 17*a* and downward slope 17*b*. Cushioning material 19 may have a non-slip function.

Upward slope 17*a* is a surface that comes into contact with side edge 37 of display 35 when display 35 is rotated around rotating shaft 33 (FIG. 2) in a direction approaching placing surface 12, that is, when display 35 is closed with respect to device body 31. In the present exemplary embodiment, when display 35 is closed with respect to device body 31, cushioning material 19 comes into contact with side edge 37 of display 35. Upward slope 17*a* is formed so as to slope upward from the inner side toward the outer side of placing surface 12 in side view (when viewed from the front). Note that in side view means viewing from an extending direction of placing surface 12. Slope angle θ1 of upward slope 17*a* with respect to the direction orthogonal to placing surface 12 (Z direction) is larger than 0 degrees and smaller than 90 degrees. Slope angle θ1 is, for example, 10 degrees or more and 80 degrees or less. Preferably, slope angle θ1 is 23 degrees or more and 48 degrees or less.

At the rear end (−X direction end) of upward slope 17*a* of rearmost retaining claw 17, a portion on the inner side of a part on the rotation track of side edge 37 of display 35 is provided so as to be positioned away from display 35 when display 35 is closed with respect to device body 31.

Downward slope 17*b* is a surface that presses device body 31 against placing surface 12. Specifically, downward slope 17*b* is a surface that presses side edge 39 of device body 31 against placing surface 12. In the present exemplary embodiment, cushioning material 19 comes into contact with side edge 39 of device body 31. Downward slope 17*b* extends from the lower end of upward slope 17*a* toward support 15. Specifically, downward slope 17*b* is formed so as to slope downward from the inner side toward the outer side of placing surface 12 in side view (when viewed from the front). Slope angle θ2 of downward slope 17*b* with respect to the direction orthogonal to placing surface 12 (Z direction) is larger than 0 degrees and smaller than 90 degrees. Slope angle θ2 is, for example, 10 degrees or more and 80 degrees or less. Preferably, slope angle θ2 is 23 degrees or more and 48 degrees or less.

In the present exemplary embodiment, downward slope 17*b* is formed such that slope angle θ1 of upward slope 17*a* becomes equal to slope angle θ2 of downward slope 17*b*. That is, upward slope 17*a* and downward slope 17*b* are formed symmetrically with respect to the horizontal plane including a line of intersection between upward slope 17*a* and downward slope 17*b*.

Support 15 has mounting part 15*a* to be mounted on base 11, and connecting part 15*b* configured to connect mounting part 15*a* to retaining claw 17. Mounting part 15*a* is formed so as to extend in the up-down direction. Mounting hole 15*aa* extending in the up-down direction is formed in the center of mounting part 15*a*. Fixing shaft 21 (FIG. 2) is inserted into mounting hole 15*aa* and through hole 11*c* of base 11, and retainer 13 is fixed to base 11.

At this time, by moving retainer 13 in the front-rear direction, device body 31 can be retained at a position desired by the user in the front-rear direction. Further, by moving retainer 13 in the up-down direction, the height of downward slope 17*b* can be adjusted according to the thickness of device body 31 placed on placing surface 12. This can cause device body 31 to be retained more reliably even if the thickness of device body 31 varies. Further, by rotating retainer 13 around fixing shaft 21, a gap between downward slope 17*b* of retaining claw 17 and placing surface 12 is adjusted.

Connecting part 15*b* extends from the upper end of mounting part 15*a* toward retaining claw 17. Connecting part 15*b* is formed so as to be curved toward the outer side of placing surface 12. Connecting part 15*b* is mounted on base 11 so as to be positioned on the outer side of the left-right end of base 11. As a result, even when the width of device body 31 is larger than the width of placing surface 12, device body 31 can be retained by connecting part 15*b*.

Figure 7:
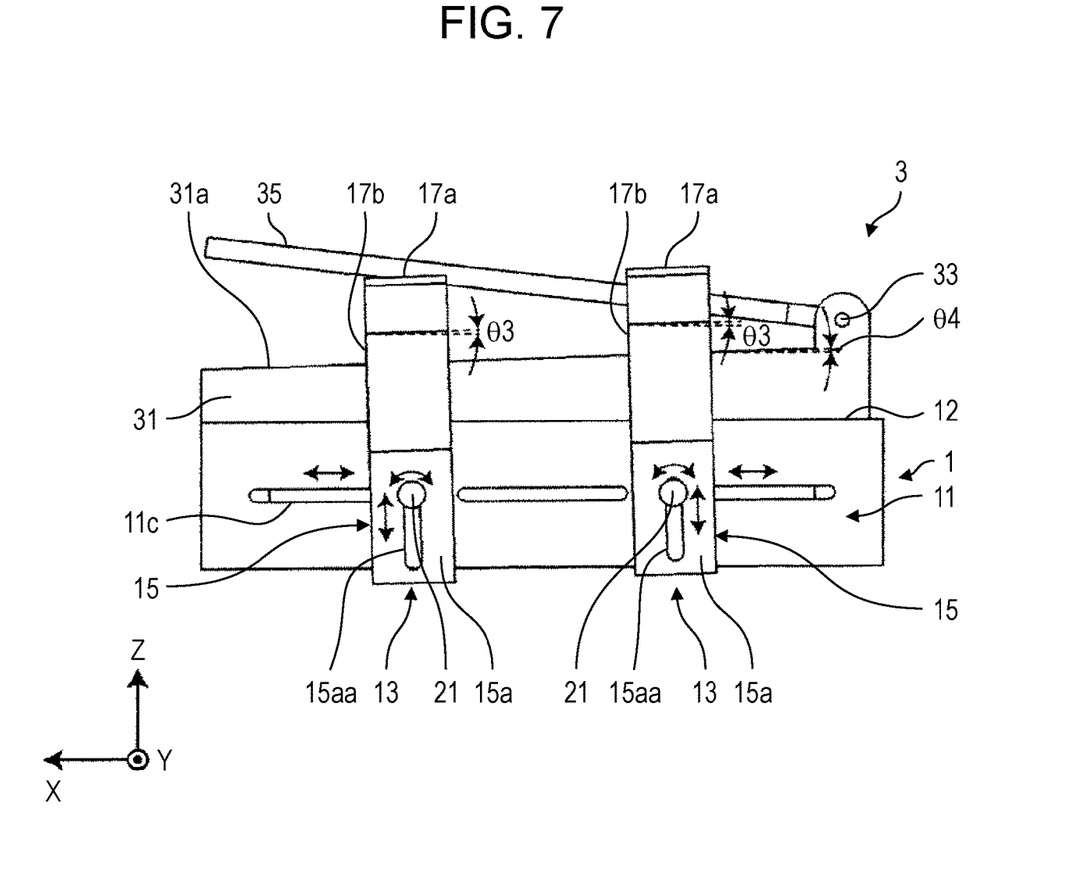
FIG. 7 is a side view showing a state in which an electronic device is retained in the electronic device retaining device according to the one exemplary embodiment of the present disclosure.
Figure 8:
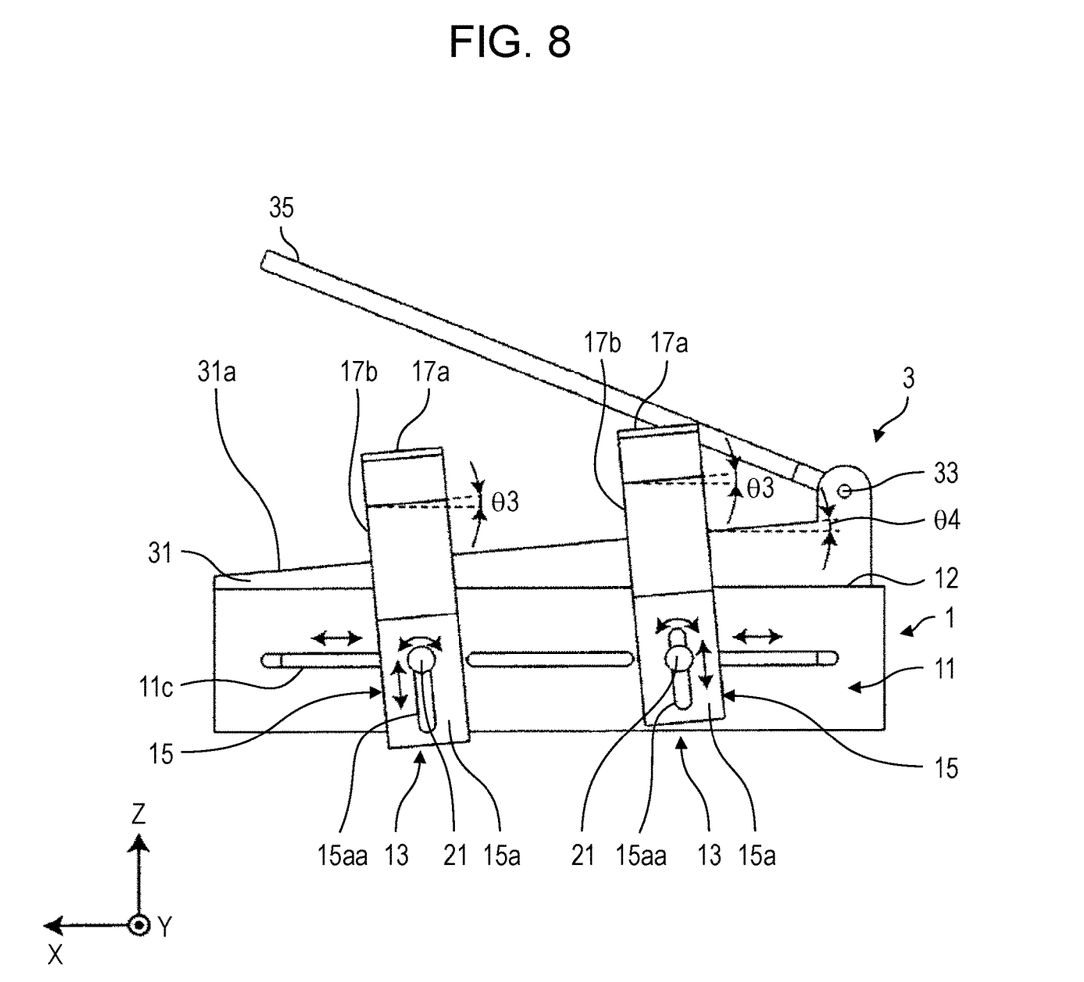
FIG. 8 is a side view showing a state in which an electronic device having a shape different from that of FIG. 7 is retained in the electronic device retaining device according to the one exemplary embodiment of the present disclosure.

Next, the retaining of electronic device 3 by electronic device retaining device 1 is described with reference to FIGS. 7 and 8. FIG. 7 is a side view showing a state in which electronic device 3 is retained in electronic device retaining device 1. FIG. 8 is a side view showing a state in which electronic device 3 having a different shape to that of FIG. 7 is retained in electronic device retaining device 1.

In the present exemplary embodiment, retainers 13 are moved in the up-down direction (Z direction) according to the thickness of device body 31 to adjust the height from placing surface 12 to downward slope 17b of retaining claw 17. With movable part 11b moved to make the width of base 11 larger than the width of device body 31, device body 31 is slid from the rear to the front (+X direction) with respect to electronic device retaining device 1 and is inserted therein. At this time, each retainer 13 is rotated around fixing shaft 21 so as to form a space to have device body 31 inserted between downward slope 17b of retaining claw 17 and placing surface 12 (for example, so as to make downward slope 17b parallel with placing surface 12 in plan view from left-right direction).

After device body 31 is placed on placing surface 12, each retainer 13 is rotated around fixing shaft 21 as shown in FIGS. 7 and 8. As a result, slope angle θ3 of retainer 13 with respect to placing surface 12 is adjusted to be equal to slope angle θ4 of upper surface 31a of device body 31 with respect to placing surface 12. Further, the position of each retainer 13 in the front-rear direction is adjusted to the position where the user desires to retain device body 31 in the front-rear direction (X direction). Further, because movable part lib is biased so as to approach fixed part 11a in the Y direction, device body 31 is sandwiched by downward slopes 17b on both the left and right sides. In the above state, by fixing retainers 13 to base 11 with fixing shafts 21, retainers 13 retain device body 31.

According to the electronic device retaining structure of the present exemplary embodiment, electronic device 3, base 11, and the pair of retainers 13 are provided. Electronic device 3 has device body 31 and display 35 rotatably connected to device body 31 through rotating shaft 33. Base 11 has placing surface 12 placed with electronic device 3. The pair of retainers 13 are mounted to face each other on the outer periphery of base 11, and press and retain device body 31 against placing surface 12. Each of the pair of retainers 13 has retaining claw 17 protruding in plan view from the outer side to the inner side of placing surface 12 and being contactable with electronic device 3. Retaining claw 17 has, at the upper part thereof, upward slope 17a sloping upward in side view from the inner side toward the outer side of placing surface 12 and coming into contact with side edge 37 of display 35 when display 35 is rotated around rotating shaft 33 in the direction approaching placing surface 12, and below upward slope 17a, downward slope 17b sloping downward in side view from the inner side toward the outer side of placing surface 12 and pressing device body 31 against placing surface 12.

With this, by retaining claw 17 having upward slope 17a at the upper part thereof, when display 35 is rotated around rotating shaft 33 in the direction approaching placing surface 12, side edge 37 of display 35 can be abutted to upward slope 17a of retaining claw 17. Therefore, screen 35a of display 35 can be prevented from coming into contact with retaining claw 17. As a result, damage to screen 35a of display 35 can be prevented. Further, by retaining claw 17 having downward slope 17b, electronic device 3 can be reliably retained by downward slope 17b and placing surface 12.

Further, each of the pair of retainers 13 is mounted on the outer periphery of base 11 by fixing shaft 21. Downward slope 17b causes the gap between retaining claw 17 and placing surface 12 to be adjusted by having the pair of retainers 13 rotated around fixing shafts 21.

As a result, even when upper surface 31a of device body 31 to be placed on placing surface 12 is sloped with respect to placing surface 12, angle θ3 of downward slope 17b with respect to placing surface 12 can be matched to slope angle θ4 of upper surface 31a with respect to placing surface 12. Therefore, electronic device 3 can be retained more reliably. Further, when electronic device 3 is placed on placing surface 12, device body 31 can be inserted through the gap which is opened between retaining claw 17 and placing surface 12. Further, by rotating retainers 13, the gap between device body 31 placed on placing surface 12 and retaining claws 17 can be eliminated, and electronic device 3 can be retained more reliably.

Further, slope angle θ1 of upward slope 17a with respect to the direction orthogonal to placing surface 12 is equal to slope angle θ2 of downward slope 17b with respect to the direction orthogonal to placing surface 12.

As a result, display 35 of electronic device 3 can be easily closed by making slope angle θ1 of upward slope 17a equal to slope angle θ2 of downward slope 17b.

Further, the pair of retainers 13 are mounted to face each other on the outer periphery of base 11, and the electronic device retaining structure has the plurality of pairs of retainers 13.

With this, electronic device 3 can be retained more reliably by providing the plurality of pairs of retainers 13.

Further, retaining claw 17 has, at upward slope 17a, cushioning material 19 that comes into contact with side edge 37 of display 35 when display 35 is rotated around rotating shaft 33 toward the direction approaching placing surface 12.

With this, cushioning material 19 can prevent damage of side edge 37 of display 35 that comes into contact with upward slope 17a, when display 35 is rotated around rotating shaft 33 in the direction approaching placing surface 12. Further, by forming retaining claw 17 from a hard material and providing cushioning material 19 at the portion that comes into contact with electronic device 3, damage due to contact with electronic device 3 can be prevented, and meanwhile, electronic device 3 can be retained more reliably.

According to electronic device retaining device 1 of the present exemplary embodiment, base 11 and the pair of retainers 13 are provided. Base 11 has placing surface 12 placed with electronic device 3. The pair of retainers 13 face each other on the outer periphery of base 11 and are movably mounted along the outer periphery to press and retain electronic device 3 against placing surface 12. Each of the pair of retainers 13 has retaining claw 17 protruding in plan view from the outer side to the inner side of placing surface 12 and being contactable with electronic device 3. Retaining claw 17 has, at the upper part thereof, upward slope 17a sloping upward in side view from the inner side toward the outer side of placing surface 12, and below upward slope 17a, downward slope 17b sloping downward in side view from the inner side toward the outer side of placing surface 12.

With this, by retaining claw 17 having upward slope 17a at the upper part thereof, when display 35 is rotated around rotating shaft 33 in the direction approaching placing surface 12, side edge 37 of display 35 can be abutted to upward slope 17a of retaining claw 17. Therefore, screen 35a of display 35 can be prevented from coming into contact with retaining claw 17. As a result, damage to screen 35a of display 35 can be prevented. Further, by retaining claw 17 having downward slope 17b, electronic device 3 can be reliably retained by downward slope 17b and placing surface 12.

Further, each of the pair of retainers 13 is mounted on the outer periphery of base 11 by fixing shaft 21. Downward slope 17b causes the gap between retaining claw 17 and placing surface 12 to be adjusted by having the pair of retainers 13 rotated around fixing shafts 21.

As a result, even when upper surface 31a of device body 31 to be placed on placing surface 12 is sloped with respect to placing surface 12, angle θ3 of downward slope 17b with respect to placing surface 12 can be matched to slope angle θ4 of upper surface 31a with respect to placing surface 12. Therefore, electronic device 3 can be retained more reliably. Further, when electronic device 3 is placed on placing surface 12, device body 31 can be inserted through the gap which is opened between retaining claw 17 and placing surface 12. Further, by rotating retainers 13, the gap between device body 31 placed on placing surface 12 and retaining claws 17 can be eliminated, and electronic device 3 can be retained more reliably.

The present disclosure is not limited to the above-described exemplary embodiment, and can be implemented in various other modes. In the above exemplary embodiment, electronic device retaining device 1 is provided in the interior of automobile 5 to retain electronic device 3, but electronic device retaining device 1 may be used in another environment.

Further, base 11 is formed in a substantially rectangular parallelepiped shape, but base 11 may be formed in a different shape.

Further, retaining claw 17 is formed in a V shape so as to protrude toward electronic device 3 mounted on placing surface 12, but other configurations can be adopted as long as the configuration includes upward slope 17a and downward slope 17b. For example, upward slope 17a and downward slope 17b may be connected by a connecting member extending in the up-down direction. This can enhance the strength of retaining claw 17.

Further, upward slope 17a and downward slope 17b have cushioning material 19, but the present invention is not limited to this. That is, upward slope 17a and downward slope 17b do not need to have cushioning material 19. For example, upward slope 17a and downward slope 17b may be formed of cushioning materials.

Further, although retainer 13 is a plate-shaped member that presses and retains device body 31 against placing surface 12, retainer 13 may be a block-shaped member instead of the plate-shaped member.

Further, as long as upward slope 17a and downward slope 17b are provided, the shapes and sizes of the plurality of retainers 13 mounted on base 11 may be different from each other.

Further, retainers 13 are mounted to face each other in the left-right direction (Y direction) on the left and right side surfaces of base 11, but other configurations may be adopted as long as retainers 13 are mounted to face each other on the outer periphery of base 11. That is, retainers 13 may not be mounted on the outer periphery of base 11 so as to face each other in the left-right direction. For example, retainers 13 mounted on both sides of base 11 may be mounted on base 11 so as to be displaced from each other in the front-rear direction (X direction).

Figure 9:
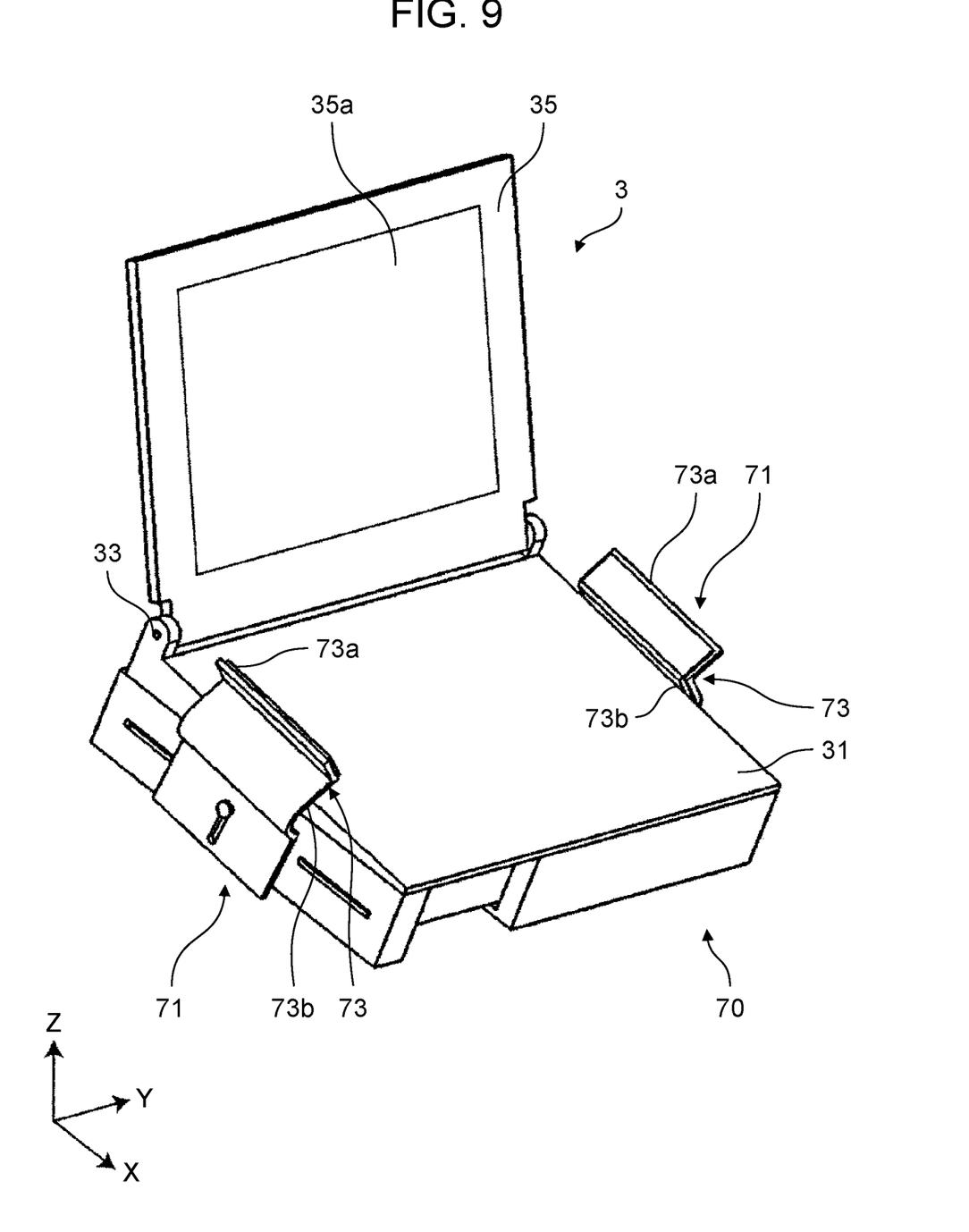
FIG. 9 is a perspective view of the electronic device retaining device to which retainers of a modified example is mounted.

Further, retainers 13 are mounted on the outer periphery of base 11 so as to face each other in the plurality of pairs (for example, two pairs), but the present invention is not limited to this. Retainer 13 may have a configuration as shown in FIG. 9, for example. FIG. 9 is a perspective view of electronic device retaining device 70 to which retainers 71 of a modified example is mounted. As shown in FIG. 9, one pair of retainers 71 are mounted facing each other on the outer periphery of base 11. Each retainer 71 includes retaining claw 73 having upward slope 73a and downward slope 73b, similarly to retaining claw 17 of FIG. 4. Also with this configuration, screen 35a of display 35 can be prevented from coming into contact with retaining claws 73.

Although the present disclosure has been fully described in connection with preferred exemplary embodiment with reference to the accompanying drawings, various modifications and corrections are obvious to those skilled in the art. It should be understood that, as long as such modifications and corrections do not deviate from the scope of the present invention according to the appended claims, the modifications and corrections are included therein. In addition, changes in the combination and order of elements in the exemplary embodiment can be achieved without departing from the scope and ideas of the present invention.

The electronic device retaining structure and the electronic device retaining device according to the present invention are useful for retaining an electronic device having a device body and a display rotatably connected to the device body.

What is claimed is:

1. An electronic device retaining structure comprising:
   an electronic device having a device body and a display rotatably connected to the device body through a rotating shaft;
   a base having a placing surface placed with the electronic device; and
   at least one pair of retainers mounted on an outer periphery of the base and facing each other, and pressing and retaining the device body against the placing surface,
   wherein each of the at least one pair of retainers has a retaining claw protruding in plan view from an outer side to an inner side of the placing surface and being contactable with the electronic device,
   the retaining claw includes:
      at an upper part, an upward slope sloping upward in side view from the inner side toward the outer side of the placing surface and having a cushioning material formed on an upper surface of the upward slope that comes into contact with a side edge of the display when the display is rotated around the rotating shaft in a direction approaching the placing surface so as to prevent a screen of the display from coming into contact with the retaining claw; and
      below the upward slope, a downward slope sloping downward in side view from the inner side toward the outer side of the placing surface and pressing the device body against the placing surface.

2. The electronic device retaining structure according to claim 1, wherein
   each of the at least one pair of retainers is mounted on the outer periphery of the base by a fixing shaft, and
   the at least one pair of retainers are rotated around the fixing shaft to cause a gap between the retaining claw and the placing surface to be adjusted.

3. The electronic device retaining structure according to claim 1, wherein the upward slope has a slope angle with respect to a direction orthogonal to the placing surface equal to a slope angle of the downward slope with respect to the direction orthogonal to the placing surface.

4. The electronic device retaining structure according to claim 1, wherein the at least one pair of retainers is a plurality of pairs of retainers that faces each other on the outer periphery of the base.

5. An electronic device retaining device comprising:
   a base having a placing surface placed with an electronic device; and a pair of retainers mounted on an outer periphery of the base and facing each other and be movable along the outer periphery, and pressing and retaining the electronic device against the placing surface, wherein each of the pair of retainers has a retaining claw protruding in plan view from an outer side to an inner side of the placing surface and being contactable with the electronic device, and the retaining claw includes:

at an upper part, an upward slope sloping upward in side view from the inner side toward the outer side of the placing surface and having a cushioning material formed on an upper surface of the upward slope and being contactable with a side edge of a display of the electronic device when the display is rotated around the rotating shaft in a direction approaching the placing surface so as to prevent a screen of the display from coming into contact with the retaining claw; and below the upward slope, a downward slope sloping downward in side view from the inner side toward the outer side of the placing surface.

6. The electronic device retaining device according to claim 5, wherein each of the pair of retainers is mounted on the outer periphery of the base by a fixing shaft, and the pair of retainers are rotated around the fixing shaft to cause a gap between the retaining claw and the placing surface to be adjusted.

\* \* \* \* \*